United States Patent
Peng et al.

(10) Patent No.: US 12,538,201 B2
(45) Date of Patent: Jan. 27, 2026

(54) GUARD PERIOD DETERMINING METHOD, NETWORK NODE, AND STORAGE MEDIUM

(71) Applicant: VIVO MOBILE COMMUNICATION CO., LTD., Dongguan (CN)

(72) Inventors: Shuyan Peng, Dongguan (CN); Huan Wang, Dongguan (CN); Jinhua Liu, Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 443 days.

(21) Appl. No.: 18/167,413

(22) Filed: Feb. 10, 2023

(65) Prior Publication Data
US 2023/0199597 A1    Jun. 22, 2023

Related U.S. Application Data

(63) Continuation of application No. PCT/CN2021/111497, filed on Aug. 9, 2021.

(30) Foreign Application Priority Data

Aug. 12, 2020 (CN) .......................... 202010809423.3

(51) Int. Cl.
*H04W 36/20* (2009.01)
*H04W 76/15* (2018.01)

(52) U.S. Cl.
CPC ........... *H04W 36/20* (2013.01); *H04W 76/15* (2018.02)

(58) Field of Classification Search
CPC ... H04W 36/20; H04W 76/15; H04B 7/15528
See application file for complete search history.

(56) References Cited

U.S. PATENT DOCUMENTS

| | | | |
|---|---|---|---|
| 10,172,071 B2 | 1/2019 | Abedini et al. | |
| 11,303,349 B2 | 4/2022 | Jo et al. | |
| 11,464,007 B2 | 10/2022 | Lee et al. | |
| 2006/0140109 A1* | 6/2006 | Lin | H04L 27/2607 370/208 |
| 2019/0327665 A1* | 10/2019 | Geng | H04W 72/30 |
| 2019/0394799 A1 | 12/2019 | Islam et al. | |
| 2020/0059879 A1 | 2/2020 | Nam et al. | |

(Continued)

FOREIGN PATENT DOCUMENTS

| | | |
|---|---|---|
| CN | 109845325 A | 6/2019 |
| CN | 110536406 A | 12/2019 |

(Continued)

OTHER PUBLICATIONS

3rd Generation Partnership Project, Technical Specification Group Radio Access Network; NR; Medium Access Control (MAC) protocol specification (Release 16), Jul. 2020, 3GPP TS 38.321, V. 16.1.0.

(Continued)

*Primary Examiner* — Sudesh M. Patidar
(74) *Attorney, Agent, or Firm* — The Webb Law Firm

(57) ABSTRACT

A guard period determining method includes: in a case that a parent integrated access backhaul (IAB) node of an IAB node supports that distributed unit (DU) receive and mobile termination (MT) receive are performed simultaneously, setting a first guard period for part of an MT transmit time period of the IAB node.

9 Claims, 3 Drawing Sheets

(56) References Cited

U.S. PATENT DOCUMENTS

| | | | |
|---|---|---|---|
| 2021/0168666 A1 | 6/2021 | Li et al. | |
| 2021/0410058 A1* | 12/2021 | Dey | H04W 40/24 |
| 2022/0039038 A1 | 2/2022 | Liu et al. | |
| 2022/0174670 A1* | 6/2022 | Liu | H04L 5/0044 |
| 2024/0357670 A1* | 10/2024 | Maya | H04W 76/10 |

FOREIGN PATENT DOCUMENTS

| | | |
|---|---|---|
| CN | 110831095 A | 2/2020 |
| CN | 111066363 A | 4/2020 |
| WO | 2020017885 A1 | 1/2020 |

OTHER PUBLICATIONS

Cewit, "Discussions on resource multiplexing among backhaul and access links", 3GPP TSG RAN WG1 Meeting #98bis, Chongqing, CN, Oct. 14-20, 2019, R1-1911237.

Cewit et al., "Discussion on simultaneous operation of IAB-node's child and parent links", 3GPP TSG RAN WG1 Meeting #102-e, e-Meeting, Aug. 17-28, 2020, R1-2006347.

Ericsson, "IAB MT/DU TX switching latency", 3GPP TSG-RAN WG4 Meeting #94-e, Electronic Meeting, Feb. 24-Mar. 6, 2020, R4-2001870.

Intel Corporation, "Enhancements to Resource Multiplexing between Child and Parent Links of an IAB Node", 3GPP TSG RAN WG1 #102-e, e-Meeting, Aug. 17-28, 2020, R1-2005893.

Vivo, "Enhancement to resource multiplexing between child and parent links", 3GPP TSG RAN WG1 #102-e, e-Meeting, Aug. 17-28, 2020, R1-2005399.

ZTE Corporation, "switching time for IAB DU and MT", 3GPP TSG-RAN WG4 Meeting #94-e, E-meeting, Feb. 24-Mar. 6, 2020, R4-2000976.

Technical Specification Group Radio Access Network, Jul. 2020, vol. 16, pp. 1-150.

Resource multiplexing between backhaul and access in IAB, Oct. 2019, pp. 1-8.

* cited by examiner

GUARD PERIOD DETERMINING METHOD, NETWORK NODE, AND STORAGE MEDIUM

CROSS-REFERENCE TO RELATED APPLICATIONS

This application is a Bypass Continuation Application of PCT/CN2021/111497 filed on Aug. 9, 2021, which claims priority to Chinese Patent Application No. 202010809423.3 filed on Aug. 12, 2020, the disclosures of which are hereby incorporated by reference in their entireties.

BACKGROUND OF THE INVENTION

Field of the Invention

This application relates to the field of communications technologies, and in particular, to a guard period determining method and apparatus, a network node, and a storage medium.

Description of Related Art

One IAB node in an integrated access backhaul (IAB) system includes two functions: a distributed unit (DU) and a mobile termination (MT).

SUMMARY OF THE INVENTION

According to a first aspect, an embodiment of this application provides a guard period determining method, including:
  determining a first guard period for at least one switching scenario of an IAB node; where
  the at least one switching scenario is a switching scenario including switching of a multiplexed link state, and the multiplexed link state includes one of:
  a link state of both DU transmit and MT transmit;
  a link state of both DU receive and MT receive;
  a link state of MT transmit and DU receive; or
  a link state of MT receive and DU transmit.

According to a second aspect, an embodiment of this application provides a guard period determining apparatus, including:
  a first determining module, configured to determine a first guard period for at least one switching scenario of an integrated access backhaul IAB node; where
  the at least one switching scenario is a switching scenario including switching of a multiplexed link state, and the multiplexed link state includes one of:
  a link state of both distributed unit DU transmit and mobile termination MT transmit;
  a link state of both DU receive and MT receive;
  a link state of MT transmit and DU receive; or
  a link state of MT receive and DU transmit.

According to a third aspect, an embodiment of this application provides a network node, including a memory, a processor, and a program or instructions stored in the memory and executable on the processor, where when the program or the instructions are executed by the processor, the steps of the guard period determining method provided in the embodiments of this application are implemented.

According to a fourth aspect, an embodiment of this application provides a non-transitory computer-readable storage medium, where a program or instructions are stored in the non-transitory computer-readable storage medium, and when the program or the instructions are executed by a processor, the steps of the guard period determining method provided in the embodiments of this application are implemented.

DESCRIPTION OF THE INVENTION

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application shall fall within the protection scope of this application.

In the specification and claims of this application, the terms such as "first", "second", and the like are intended to distinguish between similar objects but do not necessarily indicate a specific order or sequence. It should be understood that the data used in this way is interchangeable in appropriate circumstances so that the embodiments of this application can be implemented in other orders than the order illustrated or described herein, and "first" and "second" are usually for distinguishing same-type objects but not limiting the number of objects, for example, a first object may be one or multiple. In addition, "and/or" in this specification and claims indicates at least one of connected objects, and the symbol "/" generally indicates that the associated objects are in an "or" relationship.

It should be noted that technologies described in the embodiments of this application are not limited to a long term evolution (LTE)/LTE-advanced (LTE-A) system, and may also be used in various wireless communications systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the above-mentioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6-th generation (6G) communications system.

Figure 1:
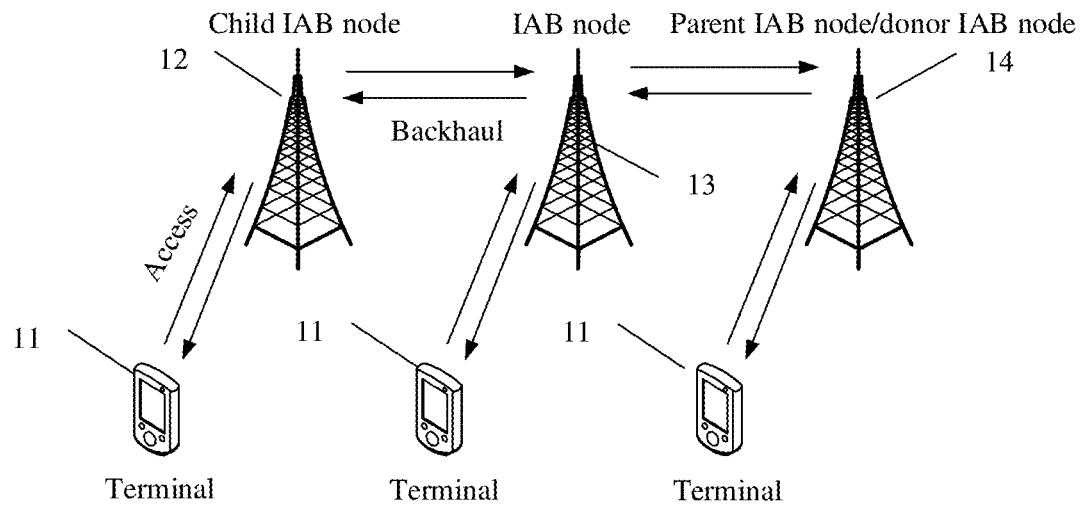
FIG. 1 is a block diagram of a wireless communications system to which the embodiments of this application are applicable.

FIG. 1 is a block diagram of a wireless communications system to which the embodiments of this application are applicable. The wireless communications system includes a terminal 11, a child IAB node 12, an IAB node 13, and a parent IAB node or a donor IAB node (or IAB donor node) 14. The terminal may access any one of the child IAB node 12, the IAB node 13, or the parent IAB node 14.

In the foregoing system, the child IAB node 12 may rely on the MT to find the IAB node 13 and establish a wireless connection to a DU of the IAB node 13. The wireless connection is referred to as a backhaul link of the child IAB node 12 and becomes an access link to the IAB node 13. After establishing a complete backhaul link, the child IAB node 12 enables its DU function and the DU provides cell services, that is, the DU may provide access services for the terminal 11. Similarly, the child IAB node 12 may rely on the MT to find the donor IAB node 14, and establish a connection to a CU of the donor IAB node 14. After the connection is established, the intermediate IAB node 12 enables its DU function, and the DU provides cell services, that is, the DU can provide access services for the terminal 11. The donor IAB node 14 can also provide access services for the terminal 11.

It should be noted that the child IAB node 12, the IAB node 13, and the parent IAB node/donor IAB node 14 are merely used as examples for illustration. In practical applications, the number of IAB nodes is not limited in the embodiments of this application.

In addition, the terminal 11 may also be referred to as a terminal device or user terminal (for example, user equipment (UE)), and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID) or vehicle user equipment (VUE), pedestrian user equipment (PUE), or Redcap UE. The Redcap UE may include: a wearable device, an industrial sensor, a video monitoring device, and so on. The wearable device includes: a wrist band, earphones, glasses, or the like. It should be noted that a type of the terminal 11 is not limited in the embodiments of this application.

The following describes a guard period determining method and apparatus, a network node, and a storage medium provided in the embodiments of this application by using embodiments and application scenarios thereof with reference to the accompanying drawings.

At present, the IAB node often performs link state switching in practical applications, for example, switching from one link state to another, and interference may occur during switching. It can be seen that IAB nodes have a problem of large interference.

Figure 2:
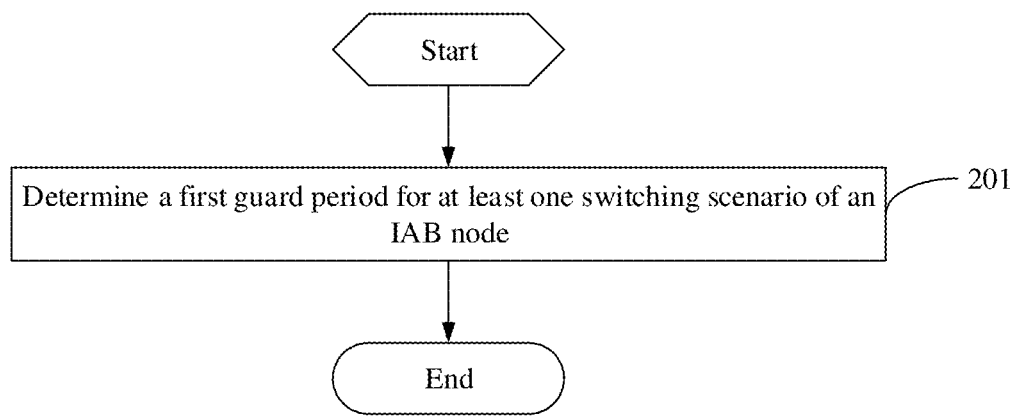
FIG. 2 is a flowchart of a guard period determining method according to an embodiment of this application.

Referring to FIG. 2, FIG. 2 is a flowchart of a guard period determining method according to an embodiment of this application. As shown in FIG. 2, the method includes the following step.

Step 201: Determine a first guard period for at least one switching scenario of an IAB node.

The at least one switching scenario is a switching scenario including switching of a multiplexed link state, and the multiplexed link state includes one of:

a link state of both DU transmit and MT transmit;
a link state of both DU receive and MT receive;
a link state of MT transmit and DU receive; or
a link state of MT receive and DU transmit.

The determining a first guard period for at least one switching scenario of an IAB node may be that the IAB node determines the first guard period for the at least one switching scenario, or may be that a parent node of the IAB node determines the first guard period for the at least one switching scenario and then configures the first guard period for or indicates the first guard period to the IAB node, or may be that a centralized unit (CU) determines the first guard period for the at least one switching scenario and configures the first guard period for the IAB node. Optionally, all or part of the first guard period for the at least one switching scenario may be configured by using higher-layer or physical-layer signaling, for example, being configured by using at least one of radio Resource Control (RRC) signaling, medium access control control element (MAC CE), downlink control information (DCI), uplink control information (UCI), or backhaul access protocol control protocol data unit (BAP control PDU).

Optionally, the IAB node may also perform at least one of information transmission and reception based on the first guard period.

The at least one switching scenario being a switching scenario including switching of a multiplexed link state can be understood as each switching scenario involving switching of the multiplexed link state. Switching of the multiplexed link state herein may mean that all or part of link states in the switching scenario are multiplexed link states, for example, switching between two multiplexed link states, or switching between one multiplexed link state and one non-multiplexed link state.

In addition, the multiplexed link state may be a frequency division multiplexing (FDM), space division multiplexing (SDM), or multiple panel transmission reception (MPTR) link state between an MT and a DU.

In this embodiment of this application, the link state may be a link state allowed by the MT and the DU. For example, the multiplexed link state may actually be only MT transmit or DU transmit, or certainly, may be an actual link state of the MT and the DU.

In addition, the first guard period may be one or more guard symbols, and the first guard period may be zero for some switching scenarios. The unit of the first guard period may alternatively be a plurality of symbols, one or more slots, microseconds, milliseconds, Tc, or a multiple of Tc. Tc is a frequency-related time unit defined in a protocol.

In a case that the at least one switching scenario represents a plurality of switching scenarios, the first guard periods for some switching scenarios may be the same, or the first guard periods for some switching scenarios may be different, which is not limited herein. Optionally, the IAB node does not transmit information during the first guard period.

In this embodiment of this application, the determining the first guard period for the at least one switching scenario of the IAB node can be implemented by performing the foregoing steps, so as to reduce interference of the IAB node.

It should be noted that in this embodiment of this application, the link state of both MT transmit and DU transmit may be referred to as MT TX&DU TX (or MT UL&DU DL);

a link state for a time period of both MT receive and DU receive is referred to as MT RX&DU RX (or MT DL&DU UL);
a link state of MT transmit and DU receive is referred to as MT TX&DU RX (or MT UL&DU UL or MPTR UL);
a link state of MT receive and DU transmit is referred to as MT RX&DU TX (or MT DL&DU DL or MPTR DL);
a link state of only MT transmit may be referred to as MT TX (or MT UL);
a link state of only MT receive may be referred to as MT RX (or MT DL);

a link state of only DU transmit may be referred to as DU TX (or DU DL); and a link state of only DU receive may be referred to as DU RX (or DU UL).

In addition, one link state may be understood as a transmit and receive state of the MT and/or the DU within one time period. For example, the link state of MT transmit and DU receive may be understood as MT transmit and DU receive.

In addition, in this embodiment of this application, a link state may be in unit of slots, sub-slots, symbols or sub-frames, for example, a link state is in a time period of one or more slots, sub-slots, symbols, or subframes.

In an optional embodiment, the at least one switching scenario includes at least one of:

a switching scenario of switching from one multiplexed link state to another multiplexed link state;

a switching scenario of switching from a multiplexed link state to a first link state; or a switching scenario of switching from a first link state to a multiplexed link state.

The first link state includes one of:
a link state of only MT transmit;
a link state of only MT receive;
a link state of only DU transmit; or
a link state of only DU receive.

The first link state may alternatively also be understood as a non-multiplexed link state.

For example, a first guard period for at least one of the following switching scenarios may be determined:

first guard period for switching from MT RX&DU RX to MT Tx;
first guard period for switching from MT RX&DU RX to MT Rx;
first guard period for switching from MT Rx to MT RX&DU RX;
first guard period for switching from MT Tx to MT RX&DU RX;
first guard period for switching from MT RX&DU RX to DU Tx;
first guard period for switching from MT RX&DU RX to DU Rx;
first guard period for switching from DU Rx to MT RX&DU RX;
first guard period for switching from DU Tx to MT RX&DU RX;
first guard period for switching from MT RX&DU RX to MT TX&DU TX;
first guard period for switching from MT TX&DU TX to MT RX&DU RX;
first guard period for switching from MT TX&DU RX to MT Tx;
first guard period for switching from MT TX&DU RX to MT Rx;
first guard period for switching from MT Rx to MT TX&DU RX;
first guard period for switching from MT Tx to MT TX&DU RX;
first guard period for switching from MT TX&DU RX to DU Tx;
first guard period for switching from MT TX&DU RX to DU Rx;
first guard period for switching from DU Rx to MT TX&DU RX;
first guard period for switching from DU Tx to MT TX&DU RX;
first guard period for switching from MT TX&DU RX to MT TX&DU TX;

first guard period for switching from MT TX&DU TX to MT TX&DU RX;
first guard period for switching from MT TX&DU RX to MT RX&DU RX;
first guard period for switching from MT RX&DU RX to MT TX&DU RX;
first guard period for switching from MT RX&DU TX to MT Tx;
first guard period for switching from MT RX&DU TX to MT Rx;
first guard period for switching from MT Rx to MT RX&DU TX;
first guard period for switching from MT Tx to MT RX&DU TX;
first guard period for switching from MT RX&DU TX to DU Tx;
first guard period for switching from MT RX&DU TX to DU Rx;
first guard period for switching from DU Rx to MT RX&DU TX;
first guard period for switching from DU Tx to MT RX&DU TX;
first guard period for switching from MT RX&DU TX to MT TX&DU TX;
first guard period for switching from MT TX&DU TX to MT RX&DU TX;
first guard period for switching from MT RX&DU TX to MT RX&DU RX;
first guard period for switching from MT RX&DU RX to MT RX&DU TX;
first guard period for switching from MT RX&DU TX to MT TX&DU RX; or
first guard period for switching from MT TX&DU RX to MT RX&DU TX.

It should be noted that the switching scenario in this embodiment of this application may include switching of link states in different timing modes, for example, the first guard period for the same or different link states of different timing modes.

In this embodiment of this application, the following timing modes can be supported:

a first time mode (also referred to as timing mode 1): timing for downlink transmission of the IAB node and the donor IAB node is aligned, where in this timing mode, timing for a terminal accessing the IAB node (that is, an access link of the IAB node) is the same as timing for a terminal accessing the donor IAB node (that is, an access link of the donor IAB node), and the IAB node does not require any additional mechanism to adjust timing for the terminal;

second timing mode (also referred to as timing mode 6): a timing method of the first timing mode is used for timing for DU DL of the IAB node, and a timing method of timing mode 2 is used for the DU and the MT (timing for MT UL is aligned with that for DU DL); in other words, timing for DU DL is aligned with DL of the donor IAB node or an upstream access point, and timing for MT UL being aligned with that for DU DL means MT TX being aligned with DU TX;

third timing mode (also referred to as timing mode 7): a timing method of the first timing mode is used for timing for DU DL of the IAB node, and a timing method of timing mode 3 is used for the DU and the MT (timing for DU UL is aligned with that for MT DL), in other words, timing for DU DL is aligned with DL of the donor IAB node or an upstream access point, and timing for DU UL being aligned with that for MT DL means DU RX being aligned with MT RX;

fourth timing mode: MT UL of the IAB node is aligned with DU UL of the IAB node, where a time unit of the alignment may be one of: slot, sub-slot, symbol, or sub-frame; and fifth timing mode: MT DL of the IAB node is aligned with DU DL of the IAB node, where a time unit of the alignment may be one of: slot, sub-slot, symbol, or sub-frame.

For example, for switching from a link state of the third timing mode to a link state of the second timing mode, the first guard period for switching from MT RX&DU RX to MT TX&DU TX may be configured; and for switching from the link state of the second timing mode to the link state of the third timing mode, the first guard period for switching from MT TX&DU TX to MT RX&DU RX may be configured.

In addition, in this embodiment of this application, MT RX&DU TX may also be referred to as an MPTR DL link state, and MT TX&DU RX may also be referred to as MPTR UL link state. For example, for switching from the link state of the second timing mode to the link state of the fourth timing mode, the first guard period for switching from MT TX&DU TX to MT TX&DU RX may be configured; for switching from the link state of the fourth timing mode to the link state of the third timing mode, the first guard period for switching from MT TX&DU RX to MT RX&DU RX may be configured; and for switching from the link state of the fourth timing mode to the link state of the fifth timing mode, the first guard period for switching from MT TX&DU RX to MT RX&DU TX may be configured.

Figure 3:
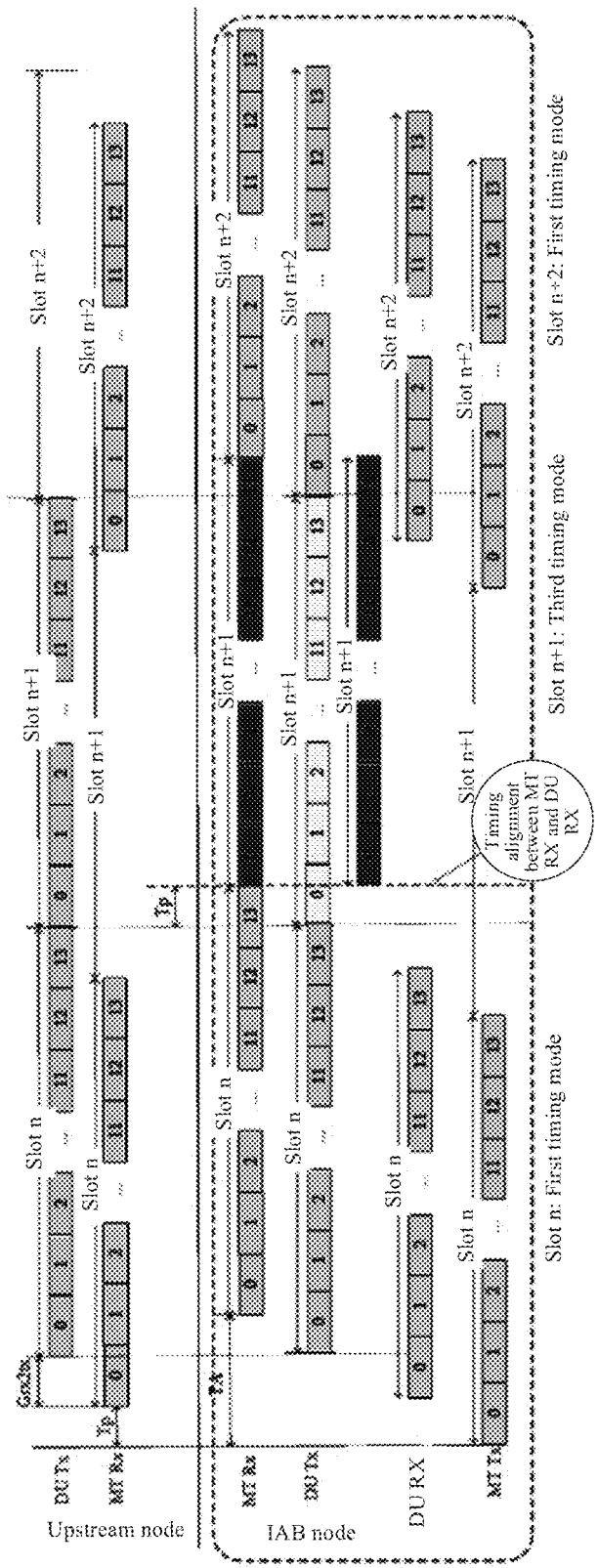
FIG. 3 is a schematic diagram of a timing mode according to an embodiment of this application.

For example, if the third timing mode and the first timing mode are supported, TDM timing between the third timing mode and the first time mode may be shown in FIG. 3. Grx2tx in FIG. 3 represents a time difference T_delta between UL and DL of the donor IAB node or upstream node. Slot n and slot n+2 represent MT Rx, DU Tx, DU Rx, and MT Tx in the first timing mode, and slot n+1 represents MT Rx, DU Tx, and DU Rx in the third timing mode, where MT Rx and DU Rx in the third timing mode are aligned.

It should be noted that the switching scenarios are only examples and are not limited in this embodiment of this application. For example, the at least one switching scenario may alternatively include a switching scenario of switching of the same link state between the first timing mode and the third timing mode.

In an optional implementation, a first guard period for a first part of switching scenarios in the at least one switching scenario is a protocol-defined value or a pre-configured value.

The first part of switching scenarios may be part of the at least one switching scenario. In this way, the first guard period for part of switching scenarios can be defined by the protocol or pre-configured, thereby reducing signaling overheads.

Optionally, the protocol-defined value or pre-configured value includes a zero or non-zero value.

For example, at least one of the following is a protocol-defined or pre-configured value:

the first guard period for switching from MT RX&DU RX to MT Rx being 0;
the first guard period for switching from MT RX&DU RX to DU Rx being 0;
the first guard period for switching from MT RX to MT RX&DU RX being 0;
the first guard period for switching from DU RX to MT RX&DU RX being 0;
the first guard period for switching from MT TX to DU TX being 0;
the first guard period for switching from MT TX to MT RX&DU RX being 0;
the first guard period for switching from MT TX&DU RX to MT TX being 0;
the first guard period for switching from MT TX&DU RX to DU RX being 0;
the first guard period for switching from MT TX to MT TX&DU RX being 0;
the first guard period for switching from DU RX to MT TX&DU RX being 0;
the first guard period for switching from MT RX&DU TX to MT RX being 0;
the first guard period for switching from MT RX&DU TX to DU TX being 0;
the first guard period for switching from MT RX to MT RX&DU TX being 0; or
the first guard period for switching from DU TX to MT RX&DU TX being 0.

It should be noted that DU RX described above may be DU RX in the third timing mode, which is certainly not limited. For example, the DU RX link state may not be limited to DU RX in the first timing mode or the third timing mode.

Optionally, a time of switching DU RX in the first timing mode to MT RX&DU RX may be negative, and may be defined to be 0. In addition, in some other switching scenarios with the first guard period being 0, an actual required value may be a negative value. For example, if the first guard period for switching from MT TX to DU TX is 0 and a negative value is actually required for the first guard period, a pre-defined value of 0 may be preferentially set; or if the first guard period for switching from MT TX to MT RX & DU RX is 0 and the first guard period actually requires a negative value, a pre-defined value of 0 may be preferentially set.

In an optional implementation, a first guard period for a second part of switching scenarios in the at least one switching scenario is determined according to a preset rule.

The second part of switching scenarios may be part of the at least one switching scenario. In this way, the first guard period for part of switching scenarios can be determined based on a preset rule to reduce signaling overheads. In addition, the preset rule may be a rule specified by the protocol.

Optionally, the preset rule includes:
that the first guard period for the second part of switching scenarios is determined based on a first guard period for at least another switching scenario.

The at least another switching scenario may include a switching scenario in the at least one switching scenario, or may include a switching scenario other than the at least one switching scenario, which is not limited.

Because the first guard period for the second part of switching scenarios is determined based on the first guard period for the at least another switching scenario, it is not necessary to configure all guard periods during configuring of the first guard period, so as to reduce signaling overheads.

Optionally, the second part of switching scenarios includes a first switching scenario, the first switching scenario is switching from a second link state to a third link state, a first guard period for the first switching scenario is determined based on a first guard period for at least one second switching scenario, and the second switching scenario is switching from a fourth link state to a fifth link state.

The second link state includes transmission behavior of the fourth link state, and the third link state includes transmission behavior of the fifth link state.

At least one of the second link state, the third link state, the fourth link state, or the fifth link state is a multiplexed link state.

The transmission behavior includes at least one of transmit or receive.

The second link state including the transmission behavior of the fourth link state may be: in a case that the second link state is a multiplexed link state, the transmission behavior of the fourth link state is a transmission behavior of the second link state, or the transmission behavior of the fourth link state is the same as the transmission behavior of the second link state; and in a case that the second link state is a non-multiplexed link state, the transmission behavior of the fourth link state is the transmission behavior of the second link state. The third link state including the transmission behavior of the fifth link state is derived by analog, which is not repeated herein.

For example, the first guard period for switching from MT RX&DU RX to MT TX&DU TX is based on first guard periods for one or more of:
the first guard period for switching from MT RX to DU TX;
the first guard period for switching from DU RX to MT TX;
the first guard period for switching from MT RX&DU RX to MT TX;
the first guard period for switching from MT RX&DU RX to DU TX;
the first guard period for switching from MT RX to MT TX&DU TX; or
the first guard period for switching from DU RX to MT TX&DU TX.

It can be seen that MT RX&DU RX described above includes the MT RX transmission behavior, and MT RX&DU RX described above includes MT RX&DU RX, that is, the two are the same. MT TX&DU TX described above includes the DU TX, MT TX, and MT TX&DU TX transmission behaviors.

In addition, the first guard period for the first switching scenario being determined based on the first guard period for the at least one second switching scenario may be equivalent to a first guard period for one switching scenario, or a maximum or minimum value of first guard periods for a plurality of switching scenarios. For example, in a case that the second timing mode and the third timing mode are running, the first guard period for the first switching scenario is the maximum or minimum value of the first guard periods for the plurality of switching scenarios.

In another example, the first guard period for switching from MT TX&DU TX to MT RX&DU RX is based on first guard periods for one or more of:
the first guard period for switching from MT TX to DU RX;
the first guard period for switching from DU TX to MT RX;
the first guard period for switching from MT TX&DU TX to MT RX;
the first guard period for switching from MT TX&DU TX to DU RX;
the first guard period for switching from MT TX to MT RX&DU RX; or
the first guard period for switching from DU TX to MT RX&DU RX.

For example, the first guard period for switching from MT TX&DU TX to MT RX&DU RX is equivalent to the first guard period for the switching scenario described above, or the maximum or minimum value of the first guard periods for the plurality of switching scenarios.

In an optional implementation, a first guard period for a fourth switching scenario in the at least one switching scenario is equal to a first guard period for a third switching scenario in the at least one switching scenario.

The third switching scenario is switching from one of the following link states to another of the following link states:
a link state of only MT transmit;
a link state of only MT receive;
a link state of only DU transmit; or
a link state of only DU receive.

The fourth switching scenario may be all or part of the at least one switching scenario. The third switching scenario may be a switching scenario defined by the protocol.

The first guard period for the fourth switching scenario is equal to the first guard period for the third switching scenario, thereby reducing signaling overheads.

Optionally, the fourth switching scenario is switching from a sixth link state to a seventh link state, and the third switching scenario is switching from an eighth link state to a ninth link state, where the sixth link state includes transmission behavior of the eighth link state, and the seventh link state includes transmission behavior of the ninth link state.

At least one of the sixth link state or the seventh link state is a multiplexed link state.

For example, the first guard period for switching from MT RX&DU RX to MT Tx is equal to the first guard period for switching from DU RX to MT Tx;
the first guard period for switching from MT RX&DU RX to MT Rx is equal to the first guard period for switching from DU RX to MT Rx;
the first guard period for switching from MT Rx to MT RX&DU RX is equal to the first guard period for switching from MT Rx to DU RX;
the first guard period for switching from MT Tx to MT RX&DU RX is equal to the first guard period for switching from MT Tx to DU RX;
the first guard period for switching from MT RX&DU RX to DU Tx is equal to the first guard period for switching from MT RX to DU Tx;
the first guard period for switching from MT RX&DU RX to DU Rx is equal to the first guard period for switching from MT RX to DU Rx;
the first guard period for switching from DU Rx to MT RX&DU RX is equal to the first guard period for switching from DU Rx to MT RX; and
the first guard period for switching from DU Tx to MT RX&DU RX is equal to the first guard period for switching from DU Tx to MT RX.

In an optional implementation, the method further includes:
determining a validity time of the first guard period.

The validity time may be a start time period or an end time period of a link state.

The determining a validity time of the first guard period may be determining the validity time of the first guard period based on protocol definition, configuration, or indication.

Optionally, the validity time of the first guard period includes:
  a start time period or an end time period of a link state including MT transmit.

In this implementation, the first guard period can be set for switching between the DU and the MT, and the first guard period takes effect on the MT side. Taking effect on the MT side can prevent DU RX deviation of the parent node from interfering with scheduling of the parent node. For example, the first guard period takes effect for MT RX&DU RX, which can prevent DU RX deviation of the parent node from interfering with scheduling of the parent node.

Optionally, the link state including MT transmit includes at least one of:
  a link state of only MT receive or MT transmit; or
  a link state of both DU receive and MT receive;

In this implementation, it can be implemented that the validity time of the first guard period takes effect only in the start or end time period of MT RX&DU RX or MT TX/RX.

Optionally, a validity time of a first guard period for a switching scenario for switching between the link state of both DU receive and MT receive and a link state of only MT receive includes: a start time period or an end time period of the link state of only MT receive; or
  a validity time of a first guard period for a switching scenario for switching between the link state of both DU receive and MT receive and a link state of only MT transmit includes: a start time period or an end time period of the link state of only MT transmit; or
  a validity time of a first guard period for a switching scenario for switching between the link state of both DU receive and MT receive and a link state of only DU receive includes: a start time period or an end time period of the link state of both DU receive and MT receive; or
  a validity time of a first guard period for a switching scenario for switching between the link state of both DU receive and MT receive and a link state of only DU transmit includes: a start time period or an end time period of the link state of both DU receive and MT receive; or
  a validity time of a first guard period for a switching scenario for switching between the link state of both DU receive and MT receive and a link state of only MT receive includes: a start time period or an end time period of the link state of both DU receive and MT receive; or
  a validity time of a first guard period for a switching scenario for switching between the link state of both DU receive and MT receive and a link state of only MT transmit includes: a start time period or an end time period of the link state of both DU receive and MT receive.

It should be noted that switching between two link states described above represents bidirectional switching, and guard periods for switching scenarios in both directions may be the same or different, for example, may be configured by using two parameters. For example, the switching scenario for switching between the link state of both DU receive and MT receive and the link state of only DU receive includes:
  switching from the link state of both DU receive and MT receive to the link state of only DU receive; or
  switching from the link state of only DU receive to the link state of both DU receive and MT receive.

Similarly, that is, switching between the above means bidirectional switching.

Optionally, in a case that the validity time of the first guard period includes the start or end time period of the link state of both DU receive and MT receive, the first guard period takes effect for at least one of DU or MT.

For example, for a first guard period between MT RX&DU RX and MT TX/RX, the first guard period acts on a start/end time period of MT TX/RX;
  for a first guard period between MT RX&DU RX and DU TX, the first guard period acts on a start/end time period of MT RX&DU RX, and the first guard period takes effect for MT and/or DU; and
  for a first guard period between MT RX&DU RX and DU RX, the first guard period acts on a start/end time period of MT RX&DU RX, and the first guard period takes effect for MT and/or DU.

In another example, for a first guard period spaced between MT RX&DU RX and MT TX/RX, the first guard period is set at MT RX&DU RX, for example:
  for a first guard period between MT RX&DU RX and MT TX/RX, the first guard period acts on an end time period of MT RX&DU RX, and the first guard period takes effect for MT and/or DU; and
  for a first guard period between MT TX/RX and MT RX&DU RX, the first guard period acts on a start time period of MT RX&DU RX, and the first guard period takes effect for MT and/or DU.

It should be noted that, in this embodiment of this application, the plurality of determined validity times of the first guard period may be implemented in combination with each other.

In an optional implementation, the method further includes:
  in a case that the IAB node supports both DU receive and MT receive, setting a first guard period for an MT transmit time period of a child node of the IAB node.

Certainly, in a case that the parent node of the IAB node supports both DU receive and MT receive, a first guard period for an MT transmit time period of the IAB node may be set.

Setting described above may be setting by the IAB node, the parent node or CU of the IAB node, or the like.

The setting the first guard period for the MT transmit time period may be independently setting the first guard period for the MT transmit time period, for example, the first guard period is independently set for the MT transmit time period of the child node of the IAB node.

In addition, a position of the MT transmit time period may be configured or dynamically indicated to the IAB node, for example, being configured or indicated by using RRC, MAC CE, or DCI; or the position of the MT transmit time period is notified to the IAB node according to a rule prescribed in the protocol. The IAB node may be understood as a child node in this implementation.

In this implementation, when the parent IAB node supports both DU receive and MT receive, the first guard period can be independently set for part of the MT transmit time period of the child node. This can avoid the problem of forward and backward deviation of MT TX timing of the child node caused by impact of DU RX timing adjustment of the parent node on MT TX timing of the child node, thereby improving accuracy of MT TX timing of the IAB node.

Optionally, during the MT transmit time period, the IAB node is in the link state of both DU receive and MT receive.

In this implementation, the MT transmit time period for which the first guard period can be independently set means that the parent node is in a state of both DU receive and MT receive when the DU of the parent node receives MT transmit of the child node in the related period, thereby improving transmission performance of the parent node.

Optionally, the MT transmit time period is a time period of a link state of only MT transmit, or the MT transmit time period is a time period of the link state of both DU transmit and MT transmit.

For example, for the first guard period from DU TX to MT TX, MT TX is the MT transmit time period for which the first guard period is independently set;

for the first guard period from MT TX to DU TX, MT TX is the MT transmit time period for which the first guard period is independently set;

for the first guard period from DU RX to MT TX, MT TX is the MT transmit time period for which the first guard period is independently set;

for the first guard period from MT TX to DU RX, MT TX is the MT transmit time period for which the first guard period is independently set;

for the first guard period from DU TX&MT TX to MT TX, MT TX is the MT transmit time period for which the first guard period is independently set;

for the first guard period from MT TX to DU TX&MT TX, MT TX is the MT transmit time period for which the first guard period is independently set;

for the first guard period from DU TX&MT TX to MT TX, DU TX&MT TX is the MT transmit time period for which the first guard period is independently set;

for the first guard period from MT TX to DU TX&MT TX, DU TX&MT TX is the MT transmit time period for which the first guard period is independently set;

for the first guard period from DU RX&MT RX to MT TX, MT TX is the MT transmit time period for which the first guard period is independently set;

for the first guard period from MT TX to DU RX&MT RX, MT TX is the MT transmit time period for which the first guard period is independently set;

for the first guard period from DU RX&MT RX to DU TX&MT TX, DU TX&MT TX is the MT transmit time period for which the first guard period is independently set; and for the first guard period from DU TX&MT TX to DU RX&MT RX, DU TX&MT TX is the MT transmit time period for which the first guard period is independently set.

Optionally, the first guard period for the MT transmit time period is a configured, dynamically indicated, or protocol-prescribed value.

The configuration and dynamic indication described above may be configured or indicated by using at least one of RRC, MAC CE, DCI, F1-C interface message, or BAP control PDU.

In an optional implementation, the determining a first guard period for at least one switching scenario of the IAB node includes:

determining the first guard period for the at least one switching scenario of the IAB node based on at least one of timing mode, duplex mode, multiplexing mode, resource configuration, or signaling indication.

The signaling-based indication described above may be indicated by using at least one of RRC, MAC CE, DCI, F1-C interface message, or BAP control PDU.

It should be noted that in a case of different timing modes, duplex modes, multiplexing modes, or resource configurations, same signaling may indicate different content. For example, in different timing modes, one piece of MAC CE signaling may represent different meanings, which is equivalent to reinterpreting a value in the MAC CE in different timing modes.

For example, if the third timing mode (also referred to as timing mode 7) is supported, a guard symbol indicated in the MAC CE is reinterpreted, that is, content in the middle column of Table 1 corresponds to reinterpretation of the MAC CE, and the meaning is as follows:

TABLE 1

| Switching scenarios | | Field for number of guard symbols in MAC CE |
|---|---|---|
| Only case 1 timing | Support case 1 and case 7 timing | |
| MT Rx to DU Tx | [MT Rx&DU RX] to DU Tx | NmbGS1 |
| MT Rx to DU Rx | DU RX to [MT Rx&DU Rx] | NmbGS2 |
| | First guard period corresponding to switching from case 1 to case 7 | |
| MT Tx to DU Tx | MT Tx to DU Tx | NmbGS3 |
| MT Tx to DU Rx | MT Tx to [MT Rx&DU Rx] | NmbGS4 |
| DU Rx to MT Tx | [MT Rx&DU Rx] to MT Tx | NmbGS5 |
| DU Rx to MT Rx | [MT Rx&DU Rx] to DU RX | NmbGS6 |
| | First guard period corresponding to switching from case 7 to case 1 | |
| DU Tx to MT Tx | DU Tx to MT Tx | NmbGS7 |
| DU Tx to MT Rx | DU Tx to [MT Rx&DU Rx] | NmbGS8 |

Case 1 indicates the first timing mode (that is, the timing mode 1), case 7 indicates the third timing mode (that is, the timing mode 7), NmbGS1 indicates the number of first guard symbols (number of guard symbol 1), NmbGS2 indicates the number of second guard symbols, and so on, which is not listed one by one herein.

It should be noted that the foregoing Table 1 is only an example of an implementation.

Optionally, the first guard period in this embodiment of this application may alternatively be configured as the following table:

As pre-defined, in the third timing mode, a time of [MT RX&DU RX] to MT RX is 0, a time of MT RX to [MT RX&DU RX] is 0, and the guard symbols may be configured as shown in Table 2:

TABLE 2

| | Field for number of guard symbols in MAC CE |
|---|---|
| [MT Rx&DU RX] to DU Tx | numGS1 |
| MT Tx to DU Tx | numGS2, |
| MT Tx to [MT Rx&DU Rx] | numGS3 |
| [MT Rx&DU Rx] to MT Tx | numGS4 |
| DU Tx to MT Tx | numGS5 |
| DU Tx to [MT Rx&DU Rx] | numGS6 |
| DU RX to [MT Rx&DU Rx] | numGS7 |
| [MT Rx&DU Rx] to DU RX | numGS8 |

Alternatively, as pre-defined, the first guard period for MT TX to DU TX is 0, a period for DU RX to [MT Rx&DU Rx] is 0, and guard symbol configurations may be shown in Table 3.

TABLE 3

| | Field for number of guard symbols in MAC CE |
|---|---|
| [MT Rx&DU RX] to DU Tx | numGS1 |
| MT Tx to [MT Rx&DU Rx] | numGS2 |
| [MT Rx&DU Rx] to MT Tx | numGS3 |
| DU Tx to MT Tx | numGS4 |
| DU Tx to [MT Rx&DU Rx] | numGS5 |
| [MT Rx&DU Rx] to DU RX | numGS6 |

It should be noted that the foregoing Tables 1 to 3 may represent configurations of the first guard period in different timing modes.

Optionally, if MT TX&DU RX (MPTR UL) timing is supported, guard symbol configurations may be shown in Table 4.

TABLE 4

| Scenario | | Field for number of guard symbols in MAC CE |
|---|---|---|
| Only case 1 timing | Support case 1 and MPTR UL timing | |
| MT Rx to DU Tx | MT Rx to DU Tx | NmbGS1 |
| MT Rx to DU Rx | MT Rx to [MT TX&DU Rx] | NmbGS2 |
| MT Tx to DU Tx | [MT TX&DU Rx] to DU Tx | NmbGS3 |
| MT Tx to DU Rx | DU RX to [MT TX&DU Rx] or MT TX to [MT TX& DU RX] | NmbGS4 |
| DU Rx to MT Tx | [MT TX&DU Rx] to DU RX or [MT TX&DU RX] to MT TX | NmbGS5 |
| DU Rx to MT Rx | [MT TX&DU Rx] to MT Rx | NmbGS6 |
| DU Tx to MT Tx | DU Tx to [MT TX&DU Rx] | NmbGS7 |
| DU Tx to MT Rx | DU Tx to MT Rx | NmbGS8 |

Optionally, if MT RX&DU TX (MPTR DL) timing is supported, guard symbol configurations may be shown in Table 5.

TABLE 5

| Scenario | | Field for number of guard symbols in MAC CE |
|---|---|---|
| Only case 1 timing | Support case 1 and MPTR UL timing | |
| MT Rx to DU Tx | MT RX to [MT RX&DU TX] or DU TX to [MT RX&DU TX] | NmbGS1 |
| MT Rx to DU Rx | [MT RX&DU TX] to DU Rx | NmbGS2 |
| MT Tx to DU Tx | MT Tx to [MT RX&DU TX] | NmbGS3 |
| MT Tx to DU Rx | MT Tx to DU Rx | NmbGS4 |
| DU Rx to MT Tx | DU Rx to MT Tx | NmbGS5 |
| DU Rx to MT Rx | DU Rx to [MT RX&DU TX] | NmbGS6 |
| DU Tx to MT Tx | [MT RX&DU TX] to MT Tx | NmbGS7 |
| DU Tx to MT Rx | [MT RX&DU TX] to MT RX or [MT RX&DU TX] to DU TX | NmbGS8 |

In an optional implementation, the method further includes:

reporting a reception timing offset to a parent node or a CU, where the reception timing offset is a reception timing offset of DU receive with respect to DU transmit.

The reception timing offset of DU receive with respect to DU transmit may be a reception timing offset of DU receive of the IAB node relative to DU transmit of the IAB node. The parent node may be a parent node of the IAB node.

In this implementation, because the reception timing offset is reported to the parent node or CU, the parent node or CU may perform more proper scheduling for the IAB node, thereby improving scheduling effects.

In an optional implementation, the method further includes:

determining a second guard period for a fifth switching scenario of the IAB node.

The fifth switching scenario includes at least one of:

a switching scenario including switching of a multiplexed link state, or a switching scenario excluding switching of a multiplexed link state.

The fifth switching scenario may include all or part of the at least one switching scenario in step 201. Optionally, the fifth switching scenario may include one or more switching scenarios other than the at least one switching scenario in step 201.

In addition, the second guard period and the first guard period may act on different timing modes. For example, for the same switching scenario, the first guard period and the second guard period that are applicable to different timing modes may be configured.

In this implementation, the second guard period has been determined, and therefore anti-interference flexibility of the IAB node can be improved, for example, different guard periods can be used in different timing modes.

It should be noted that, for a manner of determining the second guard period, reference may be made to the manner of determining the first guard period, for example, being configured by using same or different signaling.

In this embodiment of this application, the first guard period for the at least one switching scenario of the IAB node is determined, where the at least one switching scenario is a switching scenario including switching of a multiplexed link state, and the multiplexed link state includes one of: a link state of both DU transmit and MT transmit; a link state of both DU receive and MT receive; a link state of MT transmit and DU receive; or a link state of MT receive and DU transmit. In this way, because the first guard period for the at least one switching scenario of the IAB node is determined, interference to the IAB node can be reduced, and resource utilization can be improved due to the reduced interference.

Figure 4:
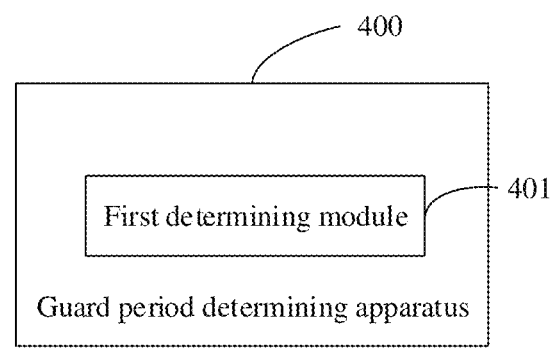
FIG. 4 is a structural diagram of a guard period determining apparatus according to an embodiment of this application.

Referring to FIG. 4, FIG. 4 is a structural diagram of a guard period determining apparatus according to an embodiment of this application. As shown in FIG. 4, the guard period determining apparatus includes:

a first determining module 401, configured to determine a first guard period for at least one switching scenario of an integrated access backhaul IAB node; where the at least one switching scenario is a switching scenario including switching of a multiplexed link state, and the multiplexed link state includes one of:

a link state of both distributed unit DU transmit and mobile termination MT transmit;

a link state of both DU receive and MT receive;

a link state of MT transmit and DU receive; or a link state of MT receive and DU transmit.

Optionally, the at least one switching scenario includes at least one of:

a switching scenario of switching from one multiplexed link state to another multiplexed link state;

a switching scenario of switching from a multiplexed link state to a first link state; or a switching scenario of switching from a first link state to a multiplexed link state; where the first link state includes one of:
a link state of only MT transmit;
a link state of only MT receive;
a link state of only DU transmit; or
a link state of only DU receive.

Optionally, a first guard period for a first part of switching scenarios in the at least one switching scenario is a protocol-defined value or a pre-configured value.

Optionally, the protocol-defined value or pre-configured value includes a zero or non-zero value.

Optionally, a first guard period for a second part of switching scenarios in the at least one switching scenario is determined according to a preset rule.

Optionally, the preset rule includes:
that the first guard period for the second part of switching scenarios is determined based on a first guard period for at least another switching scenario.

Optionally, the second part of switching scenarios includes a first switching scenario, the first switching scenario is switching from a second link state to a third link state, a first guard period for the first switching scenario is determined based on a first guard period for at least one second switching scenario, and the second switching scenario is switching from a fourth link state to a fifth link state.

The second link state includes transmission behavior of the fourth link state, and the third link state includes transmission behavior of the fifth link state; and
at least one of the second link state, the third link state, the fourth link state, or the fifth link state is a multiplexed link state.

Optionally, a first guard period for a fourth switching scenario in the at least one switching scenario is equal to a first guard period for a third switching scenario in the at least one switching scenario.

The third switching scenario is switching from one of the following link states to another of the following link states:
a link state of only MT transmit;
a link state of only MT receive;
a link state of only DU transmit; or
a link state of only DU receive.

Optionally, the fourth switching scenario is switching from a sixth link state to a seventh link state, and the third switching scenario is switching from an eighth link state to a ninth link state, where the sixth link state includes transmission behavior of the eighth link state, and the seventh link state includes transmission behavior of the ninth link state.

At least one of the sixth link state or the seventh link state is a multiplexed link state.

Optionally, the apparatus further includes:
a second determining module, configured to determine a validity time of the first guard period.

Optionally, the validity time of the first guard period includes:
a start time period or an end time period of a link state including MT transmit.

Optionally, the link state including MT transmit includes at least one of:
a link state of only MT receive or MT transmit; or
a link state of both DU receive and MT receive;

Optionally, a validity time of a first guard period for a switching scenario for switching between the link state of both DU receive and MT receive and a link state of only MT receive includes: a start time period or an end time period of the link state of only MT receive; or a validity time of a first guard period for a switching scenario for switching between the link state of both DU receive and MT receive and a link state of only MT transmit includes: a start time period or an end time period of the link state of only MT transmit; or a validity time of a first guard period for a switching scenario for switching between the link state of both DU receive and MT receive and a link state of only DU receive includes: a start time period or an end time period of the link state of both DU receive and MT receive; or a validity time of a first guard period for a switching scenario for switching between the link state of both DU receive and MT receive and a link state of only DU transmit includes: a start time period or an end time period of the link state of both DU receive and MT receive; or a validity time of a first guard period for a switching scenario for switching between the link state of both DU receive and MT receive and a link state of only MT receive includes: a start time period or an end time period of the link state of both DU receive and MT receive; or a validity time of a first guard period for a switching scenario for switching between the link state of both DU receive and MT receive and a link state of only MT transmit includes: a start time period or an end time period of the link state of both DU receive and MT receive.

Optionally, in a case that the validity time of the first guard period includes the start or end time period of the link state of both DU receive and MT receive, the first guard period takes effect for at least one of DU or MT.

Optionally, the apparatus further includes:
a configuration module, configured to: in a case that the IAB node supports both DU receive and MT receive, set a first guard period for an MT transmit time period of a child node of the IAB node.

Optionally, during the MT transmit time period, the IAB node is in the link state of both DU receive and MT receive.

Optionally, the MT transmit time period is a time period of a link state of only MT transmit, or the MT transmit time period is a time period of the link state of both DU transmit and MT transmit.

Optionally, the first guard period for the MT transmit time period is a configured, dynamically indicated, or protocol-prescribed value.

Optionally, the first determining module 401 is configured to determine the first guard period for the at least one switching scenario of the IAB node based on at least one of timing mode, duplex mode, multiplexing mode, resource configuration, or signaling indication.

Optionally, the apparatus further includes:
a reporting module, configured to report a reception timing offset to a parent node or a centralized control unit CU, where the reception timing offset is a reception timing offset of DU receive with respect to DU transmit.

Optionally, the apparatus further includes:
a third determining module, configured to determine a second guard period for a fifth switching scenario of the IAB node.

The fifth switching scenario includes at least one of:
a switching scenario including switching of a multiplexed link state, or a switching scenario excluding switching of a multiplexed link state.

The guard period determining apparatus provided in this embodiment of this application is capable of implementing the processes of the method embodiment of FIG. 2. To avoid repetition, details are not described herein again. This can also reduce interference of the IAB node.

It should be noted that the guard period determining apparatus in this embodiment of this application may be an apparatus, or may be a component, an integrated circuit, or a chip in a network device. The network node may be an IAB node or a CU.

Figure 5:
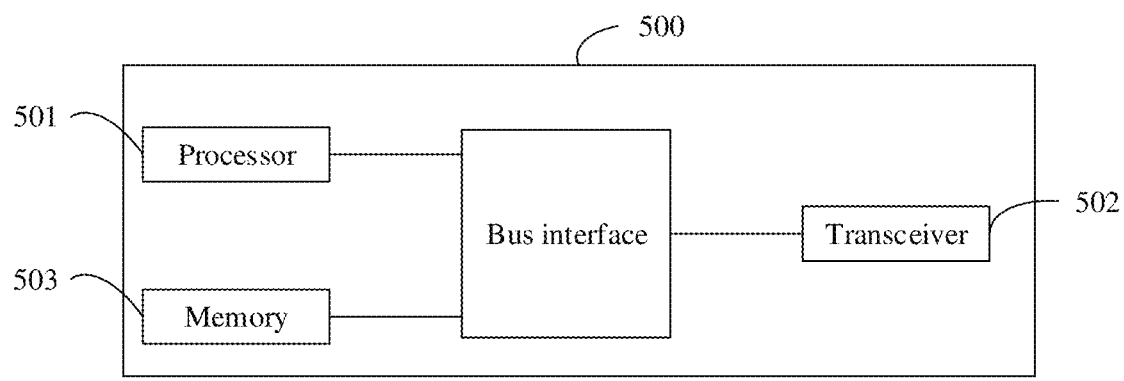
FIG. 5 is a structural diagram of a network node according to an embodiment of this application.

Referring to FIG. 5, FIG. 5 is a structural diagram of a network node according to an embodiment of this application. As shown in FIG. 5, the network node 500 includes a processor 501, a transceiver 502, a memory 503, and a bus interface.

The processor 501 is configured to determine a first guard period for at least one switching scenario of an integrated access backhaul IAB node.

The at least one switching scenario is a switching scenario including switching of a multiplexed link state, and the multiplexed link state includes one of:
   a link state of both distributed unit DU transmit and mobile termination MT transmit;
   a link state of both DU receive and MT receive;
   a link state of MT transmit and DU receive; or
   a link state of MT receive and DU transmit.

Optionally, the at least one switching scenario includes at least one of:
   a switching scenario of switching from one multiplexed link state to another multiplexed link state;
   a switching scenario of switching from a multiplexed link state to a first link state; or
   a switching scenario of switching from a first link state to a multiplexed link state; where
   the first link state includes one of:
   a link state of only MT transmit;
   a link state of only MT receive;
   a link state of only DU transmit; or
   a link state of only DU receive.

Optionally, a first guard period for a first part of switching scenarios in the at least one switching scenario is a protocol-defined value or a pre-configured value.

Optionally, the protocol-defined value or pre-configured value includes a zero or non-zero value.

Optionally, a first guard period for a second part of switching scenarios in the at least one switching scenario is determined according to a preset rule.

Optionally, the preset rule includes:
   that the first guard period for the second part of switching scenarios is determined based on a first guard period for at least another switching scenario.

Optionally, the second part of switching scenarios includes a first switching scenario, the first switching scenario is switching from a second link state to a third link state, a first guard period for the first switching scenario is determined based on a first guard period for at least one second switching scenario, and the second switching scenario is switching from a fourth link state to a fifth link state.

The second link state includes transmission behavior of the fourth link state, and the third link state includes transmission behavior of the fifth link state; and
   at least one of the second link state, the third link state, the fourth link state, or the fifth link state is a multiplexed link state.

Optionally, a first guard period for a fourth switching scenario in the at least one switching scenario is equal to a first guard period for a third switching scenario in the at least one switching scenario.

The third switching scenario is switching from one of the following link states to another of the following link states:
   a link state of only MT transmit;
   a link state of only MT receive;
   a link state of only DU transmit; or
   a link state of only DU receive.

Optionally, the fourth switching scenario is switching from a sixth link state to a seventh link state, and the third switching scenario is switching from an eighth link state to a ninth link state, where the sixth link state includes transmission behavior of the eighth link state, and the seventh link state includes transmission behavior of the ninth link state.

At least one of the sixth link state or the seventh link state is a multiplexed link state.

Optionally, the processor 501 is configured to:
   determine a validity time of the first guard period.

Optionally, the validity time of the first guard period includes:
   a start time period or an end time period of a link state including MT transmit.

Optionally, the link state including MT transmit includes at least one of:
   a link state of only MT receive or MT transmit; or
   a link state of both DU receive and MT receive;

Optionally, a validity time of a first guard period for a switching scenario for switching between the link state of both DU receive and MT receive and a link state of only MT receive includes: a start time period or an end time period of the link state of only MT receive; or
   a validity time of a first guard period for a switching scenario for switching between the link state of both DU receive and MT receive and a link state of only MT transmit includes: a start time period or an end time period of the link state of only MT transmit; or
   a validity time of a first guard period for a switching scenario for switching between the link state of both DU receive and MT receive and a link state of only DU receive includes: a start time period or an end time period of the link state of both DU receive and MT receive; or
   a validity time of a first guard period for a switching scenario for switching between the link state of both DU receive and MT receive and a link state of only DU transmit includes: a start time period or an end time period of the link state of both DU receive and MT receive; or
   a validity time of a first guard period for a switching scenario for switching between the link state of both DU receive and MT receive and a link state of only MT receive includes: a start time period or an end time period of the link state of both DU receive and MT receive; or
   a validity time of a first guard period for a switching scenario for switching between the link state of both DU receive and MT receive and a link state of only MT transmit includes: a start time period or an end time period of the link state of both DU receive and MT receive.

Optionally, in a case that the validity time of the first guard period includes the start or end time period of the link state of both DU receive and MT receive, the first guard period takes effect for at least one of DU or MT.

Optionally, the processor 501 is further configured to:
in a case that the IAB node supports both DU receive and MT receive, set a first guard period for an MT transmit time period of a child node of the IAB node.

Optionally, during the MT transmit time period, the IAB node is in the link state of both DU receive and MT receive.

Optionally, the MT transmit time period is a time period of a link state of only MT transmit, or the MT transmit time period is a time period of the link state of both DU transmit and MT transmit.

Optionally, the first guard period for the MT transmit time period is a configured, dynamically indicated, or protocol-prescribed value.

Optionally, the determining a first guard period for at least one switching scenario of the IAB node includes:
determining the first guard period for the at least one switching scenario of the IAB node based on at least one of timing mode, duplex mode, multiplexing mode, resource configuration, or signaling indication.

Optionally, the transceiver 502 is configured to:
report a reception timing offset to a parent node or a centralized control unit CU, where the reception timing offset is a reception timing offset of DU receive with respect to DU transmit.

Optionally, the transceiver 502 is configured to:
determine a second guard period for a fifth switching scenario of the IAB node.

The fifth switching scenario includes at least one of:
a switching scenario including switching of a multiplexed link state, or a switching scenario excluding switching of a multiplexed link state.

In this embodiment, interference of the IAB node can be reduced.

In addition, the network node may be the IAB node, a parent node of the IAB node, a CU or a donor IAB node, or the like.

The transceiver 502 is configured to receive and send data under control of the processor 501. The transceiver 502 includes at least two antenna ports.

In FIG. 5, a bus architecture may include any quantity of interconnected buses and bridges, for interconnecting various circuits of one or more processors represented by the processor 501 and a memory represented by the memory 503. The bus architecture may further interconnect various other circuits such as a peripheral device, a voltage regulator, and a power management circuit. These are all well known in the art, and therefore are not described in this specification. The bus interface provides an interface. The transceiver 502 may be a plurality of components, that is, the transceiver 502 includes a transmitter and a receiver, and provides a unit for communicating with various other apparatuses on a transmission medium. For different user equipments, the user interface 504 may also be an interface for externally or internally connecting a required device, and the connected device includes but is not limited to a mini keyboard, a display, a speaker, a microphone, a joystick, or the like.

The processor 501 is responsible for management of the bus architecture and general processing, and the memory 503 is capable of storing data that is used by the processor 501 during operation.

Optionally, an embodiment of this application further provides a network-side device, including a processor 501, a memory 503, and a program or instructions stored in the memory 503 and executable on the processor 501. When the program or the instructions are executed by the processor 501, the processes of the foregoing guard period determining method embodiments are implemented, with the same technical effects achieved. To avoid repetition, details are not described herein again.

An embodiment of this application further provides a non-transitory computer-readable storage medium, where a program or instructions are stored in the non-transitory computer-readable storage medium, and when the program or the instructions are executed by a processor, the steps of the guard period determining method are implemented.

An embodiment of this application further provides a program product, where the program product is stored in a non-volatile storage medium, and the program product is executed by at least one processor to implement the steps of the guard period determining method.

The processor is a processor in the terminal or the network device described in the foregoing embodiments. The non-transitory computer-readable storage medium includes a computer read-only memory (ROM), a random access memory (RAM), a magnetic disk, or an optical disc.

An embodiment of this application further provides a chip, where the chip includes a processor and a communications interface, the communications interface is coupled to the processor, and the processor is configured to execute a program or instructions to implement the processes of the foregoing embodiments of the guard period determining method, with the same technical effects achieved. To avoid repetition, details are not repeated herein.

It should be understood that the chip mentioned in the embodiments of this application may also be referred to as a system-level chip, a system chip, a chip system, a system-on-chip, or the like.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. Based on such an understanding, the technical solutions of this application essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A guard period determining method, performed by an integrated access backhaul (IAB) node, comprising:
in a case that a parent IAB node of the IAB node supports that distributed unit (DU) receive and mobile termination (MT) receive are performed by the parent IAB node simultaneously, setting a first guard period for part of an MT transmit time period of the IAB node, wherein
the first guard period comprises at least one of the following:
the first guard period from MT transmit (TX) to DU TX;
the first guard period from DU receive (RX) to MT TX; or
the first guard period from MT TX to DU RX.

2. The method according to claim 1, wherein the first guard period is a configured, dynamically indicated, or protocol-prescribed value.

3. The method according to claim 1, wherein the method further comprises:
reporting, by the IAB node, a reception timing offset to the parent IAB node or a centralized control unit (CU), wherein the reception timing offset is a reception timing offset of DU receive of the IAB node with respect to DU transmit of the IAB node.

4. A network node, wherein the network node is an integrated access backhaul (IAB) node comprising a memory, a processor, and a program or instructions stored in the memory and executable on the processor, wherein the program or instructions, when executed by the processor, cause the network node to perform:
in a case that a parent IAB node of the IAB node supports that distributed unit (DU) receive and mobile termination (MT) receive are performed by the parent IAB node simultaneously, setting a first guard period for part of an MT transmit time period of the IAB node, wherein
the first guard period comprises at least one of the following:
the first guard period from MT transmit (TX) to DU TX;
the first guard period from DU receive (RX) to MT TX; or
the first guard period from MT TX to DU RX.

5. The network node according to claim 4, wherein the first guard period is a configured, dynamically indicated, or protocol-prescribed value.

6. The network node according to claim 4, wherein the program or instructions, when executed by the processor, cause the network node to further perform:
reporting a reception timing offset to the parent IAB node or a centralized control unit (CU), wherein the reception timing offset is a reception timing offset of DU receive of the IAB node with respect to DU transmit of the IAB node.

7. A non-transitory computer-readable storage medium, wherein the non-transitory computer-readable storage medium stores a program or instructions, and the program or instructions, when executed by a processor of a network node being an integrated access backhaul (IAB) node, cause the network node to perform:
in a case that a parent IAB node of the IAB node supports that distributed unit (DU) receive and mobile termination (MT) receive are performed by the parent IAB node simultaneously, setting a first guard period for part of an MT transmit time period of the IAB node, wherein
the first guard period comprises at least one of the following:
the first guard period from MT transmit (TX) to DU TX;
the first guard period from DU receive (RX) to MT TX; or
the first guard period from MT TX to DU RX.

8. The non-transitory computer-readable storage medium according to claim 7, wherein the first guard period is a configured, dynamically indicated, or protocol-prescribed value.

9. The non-transitory computer-readable storage medium according to claim 7, wherein the program or instructions, when executed by the processor, cause the processor of the network node to further perform:
reporting a reception timing offset to the parent IAB node or a centralized control unit (CU), wherein the reception timing offset is a reception timing offset of DU receive of the IAB node with respect to DU transmit of the IAB node.

* * * * *